United States Patent
Fitzgerald

[11] Patent Number: 5,555,669
[45] Date of Patent: Sep. 17, 1996

[54] SURF FISHING SINKER

[76] Inventor: Terry L. Fitzgerald, 1604 Park Ave., Melbourne, Fla. 32901

[21] Appl. No.: 489,059

[22] Filed: Jun. 9, 1995

[51] Int. Cl.$^6$ ..................................................... A01K 95/00
[52] U.S. Cl. ........................ 43/44.96; 43/44.97; 43/43.13
[58] Field of Search .......................... 43/44.96, 44.97, 43/43.13, 43.15, 43.1; D22/145

[56] References Cited

U.S. PATENT DOCUMENTS

| | | | |
|---|---|---|---|
| 1,776,967 | 9/1930 | Eckart | 43/44.96 |
| 1,802,295 | 4/1931 | Wear | 43/43.13 |
| 1,810,565 | 6/1931 | Kenely | 43/44.96 |
| 2,490,460 | 12/1949 | McAvoy | 43/44.97 |
| 2,502,944 | 4/1950 | Gross | 43/43.13 |
| 2,770,909 | 11/1956 | Illgner | 43/44.97 X |
| 2,788,606 | 4/1957 | Boggs | 43/44.97 |
| 2,841,916 | 7/1958 | Ueda | 43/44.96 |
| 4,019,275 | 4/1977 | Ruppe | 43/44.96 |

Primary Examiner—J. Elpel
Attorney, Agent, or Firm—Harpman & Harpman

[57] ABSTRACT

A fishing sinker for use in ocean surf fishing that provides an adjustable snag free temporary anchor for fishing lines against the surf surge. The fishing sinker has multiple adjustable fingers that engage the bottom and hold the fishing line with attached hook assembly outwardly from the shore. A rudder provides elevation to bring the sinker to the surface as it is retrieved.

4 Claims, 2 Drawing Sheets

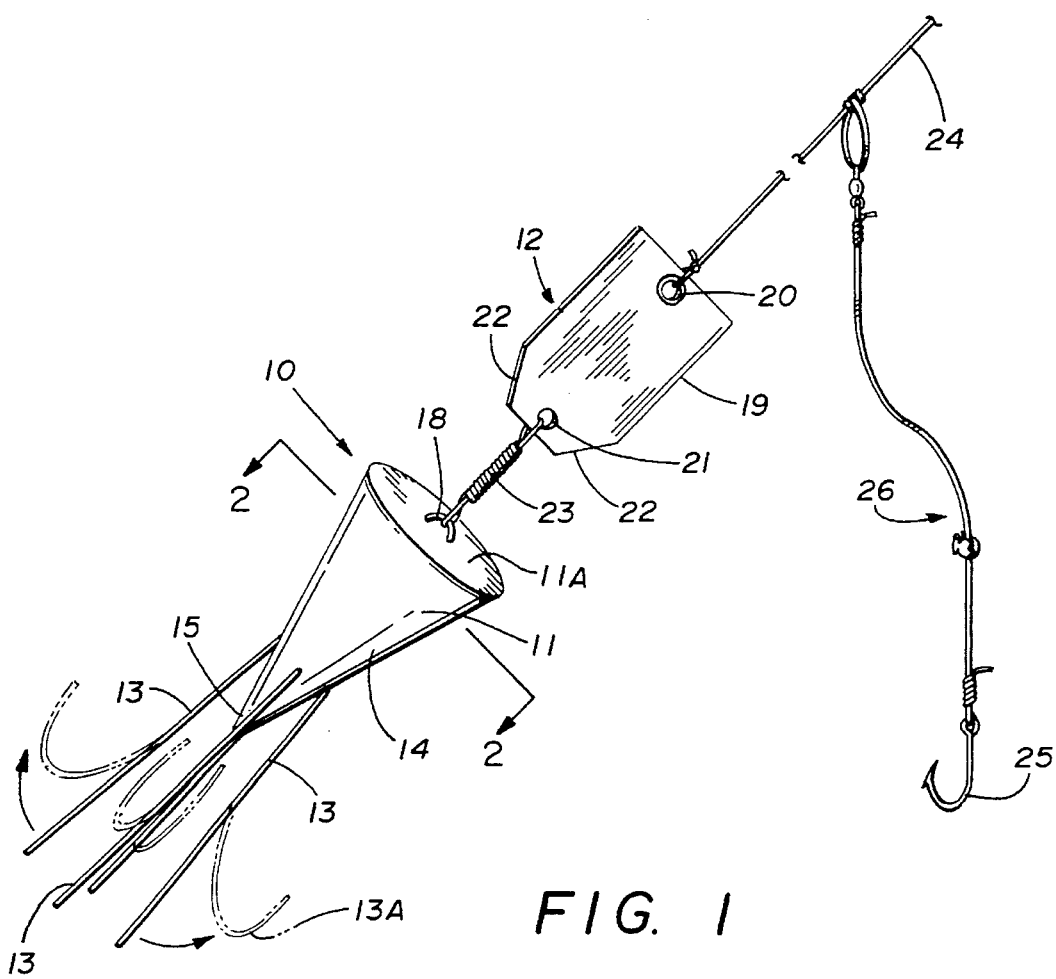
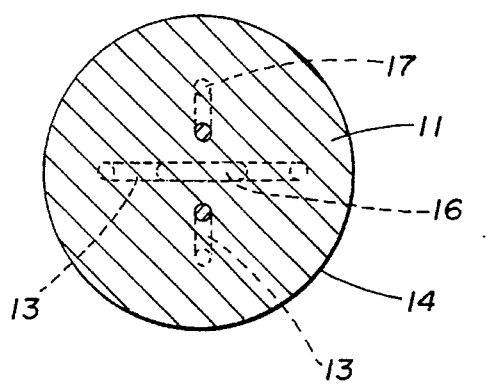
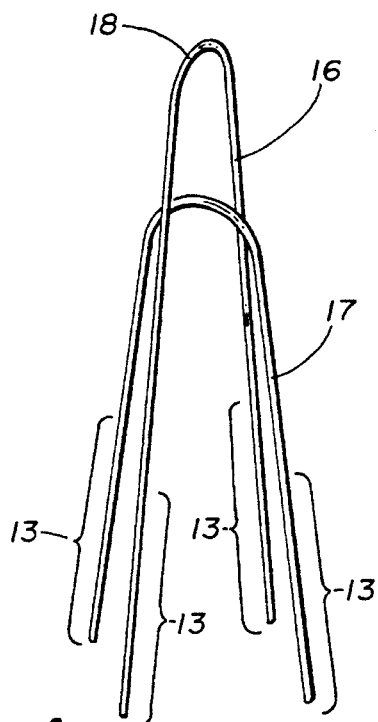
FIG. 1
FIG. 2
FIG. 4

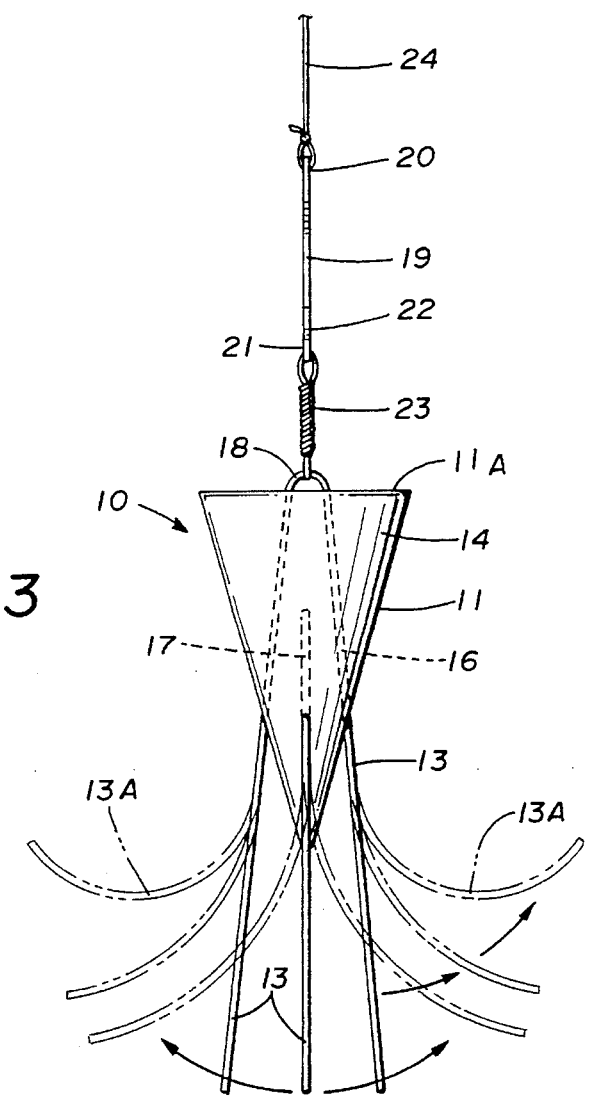
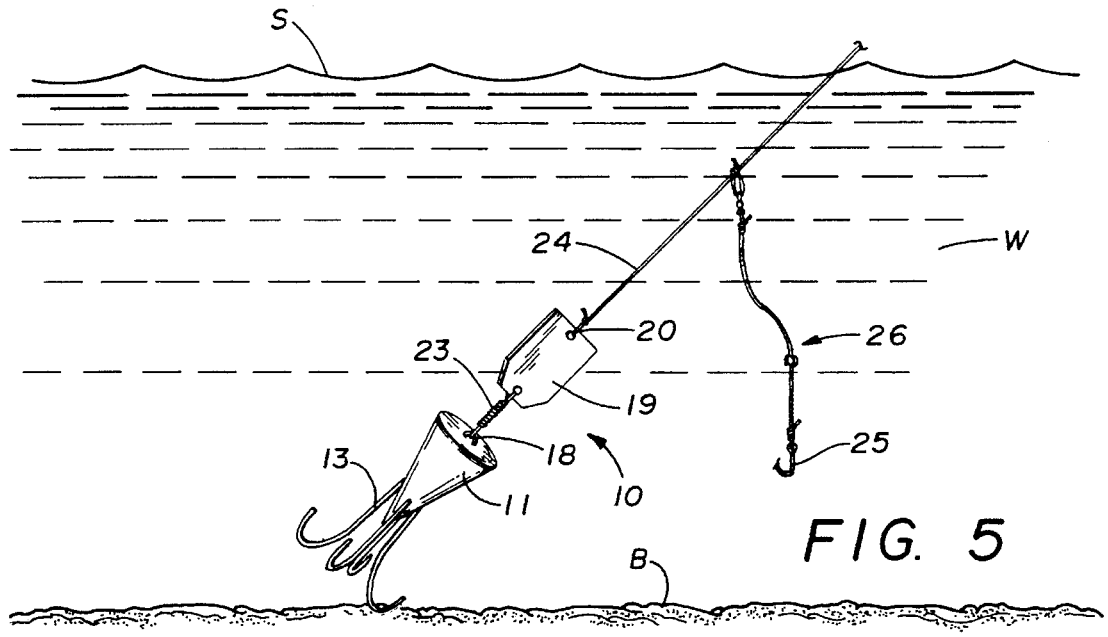

SURF FISHING SINKER

BACKGROUND OF THE INVENTION

1. Technical Field

This device relates to fishing tackles and more particularly to fishing sinkers and the like that are used to hold a fishing line and attached hook at a selected position in the water against surf action.

2. Description of Prior Art

Prior art devices of this type have relied on a variety of different constructions that attempt to engage and hold a fishing line to the bottom to support a hook and lure assembly in relation thereto, see for example U.S. Pat. Nos. 1,810,565, 2,490,460 and 2,788,606.

In U.S. Pat. No. 1,810,565 a fishing lure and grapple can be seen having a plurality of rigid arms pivotally secured to a hollow body member around its perimeter edge. Each arm is spring urged so that disengagement from the bottom can be achieved.

U.S. Pat. No. 2,490,460 is directed to a removable anchor device that uses a sinker with a fixed grappling hooks extending therefrom and a spring release mechanism that can be selectively released from the main line so as to engage a retrieval line attached to the grapple hook below the sinker for retrieval of same.

U.S. Pat. No. 2,788,606 discloses a fish bate return used in conjunction with a fishing lure to prevent the loss, if snagged, during use. The device has pairs of unequal length snag engagement arms with a lure and hook attachment extending therefrom.

SUMMARY OF THE INVENTION

A fishing snag free surf sinker that positions and selectively holds a fishing line and hook assembly out in the surf. The device utilizes multiple adjustable fingers extending from the sinker with a fixed position rudder in spaced relation attached thereto. Each of the fingers is independently adjustable into increasing bottom engagement positions dependent on surf conditions.

DESCRIPTION OF THE DRAWINGS

FIG. 1 is a perspective view of the invention in use with a fish hook assembly attached thereto;

FIG. 2 is a cross-sectional view on lines 2—2 of FIG. 1;

FIG. 3 is a side elevational view of the invention with adjustable finger portions shown in broken lines;

FIG. 4 is an enlarged perspective view of the adjustable engagement fingers; and FIG. 5 is a perspective view of the invention shown in use in a marine environment with attached line and hook assembly.

DESCRIPTION OF THE PREFERRED EMBODIMENT

Referring to FIGS. 1 and 3 of the drawings a fishing sinker 10 can be seen having a main body member 11 with a rudder 12 secured thereto. The main body member 11 is formed in a monolithic fusto-conical shape having a top surface 11A with a tapered outer surface 14 terminating in a bottom point at 15. A plurality of control fingers 13 extend outwardly from the tapered outer surface 14 opposite said top surface 11A. The control fingers 13 are formed from a pair of unequal wire lengths 16 and 17 that are folded over on themselves in inverted U-shaped configurations, best seen in FIG. 4 of the drawings. The wire sections 16 and 17 are embedded within the main body member 11 generally along its longitudinal axis with the wire section 16 extending outwardly from the top surface 11A forming an attachment loop 18. The wire section 16's free ends define two of the hereinbefore described fingers 13 that extend from the main body member inwardly from its bottom point 15 as best seen in FIGS. 1, 3, and 5 of the drawings. The remaining wire section 17 is embedded within the monolithic body member 11 midway between the respective top surface 11A and bottom point 15 adjacent the first wire section 16 inwardly from the bottom point 15.

The rudder 12 is formed of a generally flat rectangular element 19, best seen in FIG. 1 of the drawings, has oppositely disposed apertures within at 20 and 21. The aperture at 20 is beveled thereabout to which end purpose will be discussed in greater detail hereinafter.

The rudder 12 has tapered corners at 22 facing the top surface 11A of the main body member 11 and is secured to the main body member 11 by an interconnecting wire fitting 23 that is engaged through the loop 18 and the aperture 21 and twisted about itself to secure the rudder 12 to the main body member 11 in a fixed non-rotational relationship as will be well understood by those skilled in the art.

Referring now to FIGS. 2 and 4 of the drawings, the alignment of the wire sections 16 and 17 chosen for illustration can be seen wherein the wire section 17 is positioned within the wire section 16 at right angles to its transverse alignment with the main body member 11.

It will be evident from the above description that the fishing sinker 10 of the invention is of a two-part construction with the main body member 11 and its multiple extending fingers 13 interconnected in spaced relation to a rudder 12.

Referring now to FIGS. 1, 3 and 5 of the drawings, a fishing line 24 secured to the remaining beveled aperture 20 in the rudder 12 by tying same thereto. It will be evident that the bevel in the aperture 20 defines a non-abrasive edge surface for the engagement of the fishing line which under normal circumstances would be subject to abrasion and possible failure due to the relative movement of the fishing line and the point of attachment to the rudder 12.

A fishing hook 25 is attached to a leader line and hook assembly 26 that extends from and is secured to the main fishing line 24 in selected spaced relation to said point of rudder attachment as hereinbefore described.

In use, the multiple fingers 13 extending from the body member 11 formed from the respective wire pairs 16 and 17 can be adjustably deformed to adjust to ocean surf conditions by bending each of the fingers 13 in a progressively curved angular radius as illustrated in the broken lines at 13A and in FIG. 5 in solid lines from a straight initial configuration as illustrated.

By adjusting the fingers 13 according to different surf situations it will seen that for light conditions the fingers 13 remain in a generally straight alignment while an increasing surf condition requires incrementally bending the fingers 13 to make the sinker of the invention more aggressively engageable of the bottom B as seen in FIG. 5.

Should the sinker of the invention become snagged (not shown) it can be freed by moderate progressive increased pressure on the fishing line 24 which would tend to straighten out to some extent the hereinbefore described fingers 13 so as to free itself in those conditions as will be understood by those skilled in the art.

In practice, the monolithic body member 11 can be formed from anyone of a group of dense weight materials such as lead or brass. The wire sections 16 and 17 which form the bendable fingers 13 can typically be formed from copper or other like material that can be bent easily and retain its shape in repeated action without loss of integrity.

In use the fishing sinker 10 is cast out into the surf S as seen in FIG. 5 of the drawings, engaging the bottom B holding the fishing line 24 and attached lead line and hooker assembly 26 in desired location in the water W.

As the sinker 10 is retrieved from its surf position, the rudder 12 guides the sinker 10 to the surface of the water W as it is reeled in. This guiding action of the fixed non-rotatable rudder 12 prevents bottom snags of the fingers 13 during retrieval.

It will thus be seen that a new and novel fishing line sinker has been illustrated and described and it will be apparent to those skilled in the art that various changes and modifications may be made therein without departing from the spirit of the invention.

Therefore I claim:

1. A fishing sinker assembly to position and hold a fishing line against wave action comprises, a monolithic body member having a tapered shape extending from a flat surface to a point, a plurality of fingers extending from said body member adjacent its point in spaced relation to said flat surface, a rudder secured in fixed rotational relation to said flat surface of said main body member, said fingers being deformable from a first position to a second and subsequent curved angular position in relation to said first position, and means for securing said rudder to said body member.

2. The fishing sinker of claim 1 wherein said fingers are formed in pairs from single wire segments.

3. The fishing sinker of claim 2 wherein one of said wire segments extends from said body member defining a loop.

4. The fishing sinker of claim 1 wherein said rudder is of a flat rectangular configuration with apertures therein.

* * * * *